United States Patent [19]
Reed

[11] Patent Number: 5,551,185
[45] Date of Patent: Sep. 3, 1996

[54] FISHING LURE

[76] Inventor: Dewayne Reed, 35 K. Littleton Rd., Deville, La. 71328

[21] Appl. No.: 176,206

[22] Filed: Jan. 3, 1994

[51] Int. Cl.$^6$ .................................................. A01K 85/00
[52] U.S. Cl. ........................ 43/42.39; 43/42.31; 43/42.37
[58] Field of Search ................. 43/42.37, 42.31, 43/42.24, 42.39, 42.22, 42.4, 42.49, 42.25, 42.27, 42.36, 42.45, 42.41

[56] References Cited

U.S. PATENT DOCUMENTS

| | | | |
|---|---|---|---|
| 1,772,058 | 8/1930 | Welch | 43/42.33 |
| 1,820,887 | 8/1931 | Pflueger | 43/44.8 |
| 1,863,544 | 6/1932 | Prouse | 43/44.8 |
| 3,197,909 | 8/1965 | Adams | 43/42.15 |
| 3,716,937 | 2/1973 | Santosuosso | 43/42.32 |
| 3,757,451 | 9/1973 | Cottle | 43/42.37 |
| 4,712,326 | 12/1987 | Hoover et al. | 43/42.39 |
| 4,713,907 | 12/1987 | Dudeck | 43/42.39 |
| 4,864,766 | 9/1989 | Bohn | 43/42.39 |
| 4,926,577 | 5/1990 | Radtchenko | 43/42.22 |
| 4,945,669 | 8/1990 | Webel | 43/42.39 |
| 4,995,189 | 2/1991 | Crihfield | 43/42.31 |
| 5,001,856 | 3/1991 | Gentry | 43/42.31 |
| 5,092,073 | 3/1992 | Kaecker | 43/42.39 |
| 5,136,801 | 8/1992 | Pond | 43/42.39 |
| 5,245,782 | 9/1993 | Pahle | 43/42.37 |

*Primary Examiner*—Chuck Y. Mah

[57] ABSTRACT

An artificial lure for supporting live bait, such as crawfish, including a rounded base portion, having a substantially flat lower face for resting on the surface; a hook member extending from the base at an angle so that the barb of the hook is at a position above the base member when the base is resting so that bait positioned on the hook have the appearance of being live in the water; a channel formed in the base for stabilizing the lure, when the base member is being lowered into or pulled through the water; a rattler secured to the base for creating a noise around the lure; and a combination color scheme formed on the base to attract fish.

10 Claims, 4 Drawing Sheets

FISHING LURE

BACKGROUND OF THE INVENTION

1. Field of the Invention

The present invention relates to fishing lures. More particularly, the present invention relates to an improved fishing lure so that the positioning of the hook portion of the lure in relation to the body portion provides that the bait, such as crawfish, secured to the hook, remains in the upright position during movement of the lure, or when the lure is positioned on the bottom of a river or lake.

2. General Background

It is widely accepted that fishing lures are in constant state of improvement and development. It is also widely accepted that the most successful bait to utilize in catching fish is live bait; that is, live shrimp, minnows or the like. Such bait swim around in the water and attract the fish in greater numbers. Other types seek to replace live bait with an artificial lure, in the hope that the fish will strike the lure, and, of course, reduce or eliminate the need for live bait, such as shrimp, crawfish, minnows or the like. Another type of prominent lures are the type which utilize the combination of the artificial lure, with a means to secure live bait, for greater appeal to the fish.

However, such a combination rig, although attractive may be an expensive and time-consuming way to attempt to catch fish. Therefore, it would be beneficial to have an artificial lure which could be utilized with bait, live or frozen, so that the bait could be positioned onto the hook of the lure, and give the appearance that the bait is alive.

Patents were found as a result of a search conducted in the art, and these are described in the accompanying Prior Art Statement being submitted herewith.

SUMMARY OF THE PRESENT INVENTION

The apparatus of the present invention solves the problems in the art in a simple and straightforward manner. What is provided is an artificial lure for supporting live bait, such as crawfish, including a rounded base portion, having a substantially flat lower face for resting on the surface; a hook member extending from the base at an angle so that the barb of the hook is at a position above the base member when the base is resting so that bait positioned on the hook has the appearance of being live in the water; a channel formed in the base for stabilizing the lure, when the base member is being lowered into or pulled through the water; means secured to the base for creating a noise around the lure; and a combination color scheme formed on the base to attract fish.

Therefore, it is a principal object of the present invention to provide a combination artificial, live bait lure moveable in the water, and positionable on the surface of the bottom of water, so that the bait is maintained upright in the water;

It is a further object of the present invention to provide a combination fishing lure having specific color combination schemes to help attract fish to the lure.

It is a further object of the present invention to provide an artificial lure which can support bait, such as crawfish, on a hook member, in the upright position as the lure is moving through the water or resting on the floor of the body of water.

It is a further object of the present invention to provide the combination of a fishing lure which supports bait on a hook, so that the lure body color scheme, the position of the bait on the hook, together with a ratting member, tend to attract fish to the lure.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
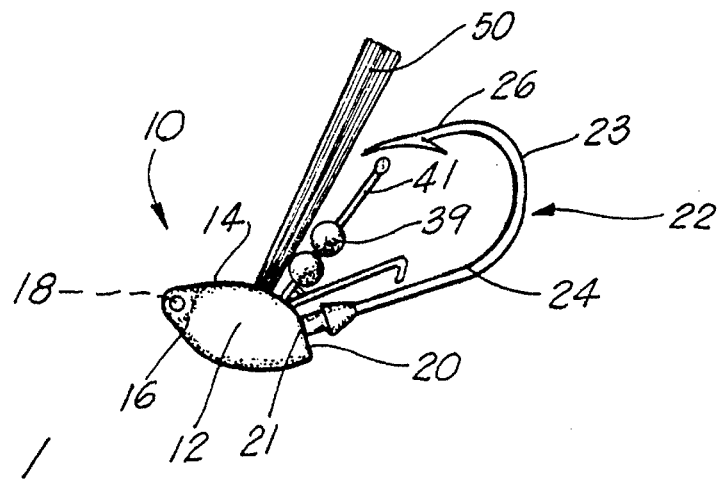
FIG. 1 illustrates an overall side view of the preferred embodiment of the present invention.
Figure 2:
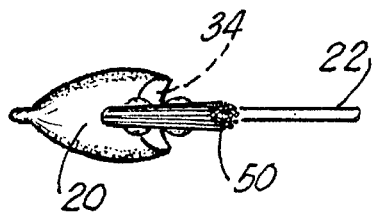
FIG. 2 illustrates a top view of the preferred embodiment of the present invention.
Figure 3:
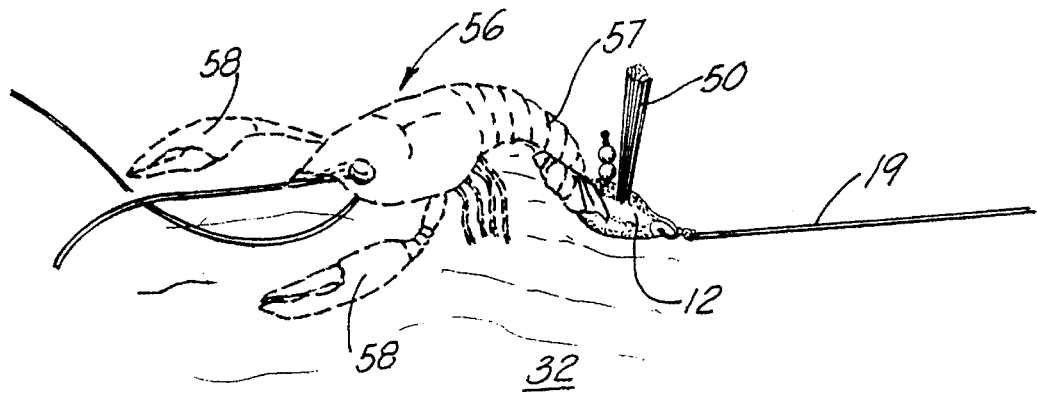
FIGS. 3 and 4 illustrate perspective views of the present invention with a live bait positioned thereupon.

FIGS. 1 through 10 illustrate the preferred embodiment of the present invention by the numeral 10. As illustrated, apparatus 10 comprises a body member 12, having a smooth, curvaceous wall 14, defining a tapered forward end 16, having a bore 18 therethrough for attaching fishing line 19 thereto, as illustrated in FIG. 3. Body member 12 further comprises an upper rear face 20, where there is secured the proximal end 21 of a fishhook 22, with the shaft 24 of hook 22 extending upward at substantially a 45 degree angle from body member 12, and terminating in the distal barbed end 26 of hook member 22. As illustrated, the barbed end 26 of hook member 22, when the body member 12 is in position extends above and out from body 12, with the curved portion 23 of hook 22 positioned upward for receiving a live bait thereupon, as will be described further.

Figure 5:
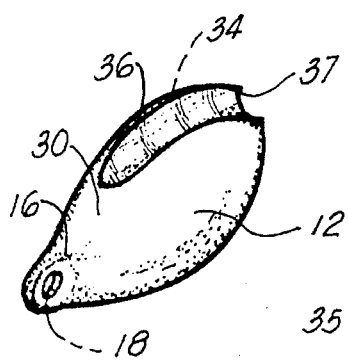
FIG. 5 illustrates a partial view of the body portion of the preferred embodiment of the present invention.
Figure 6:
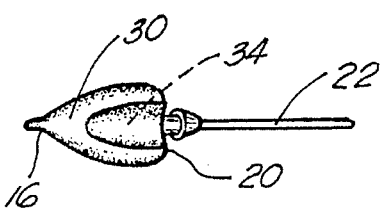
FIG. 6 illustrates an underside view of the body portion of the present invention.
Figure 7:
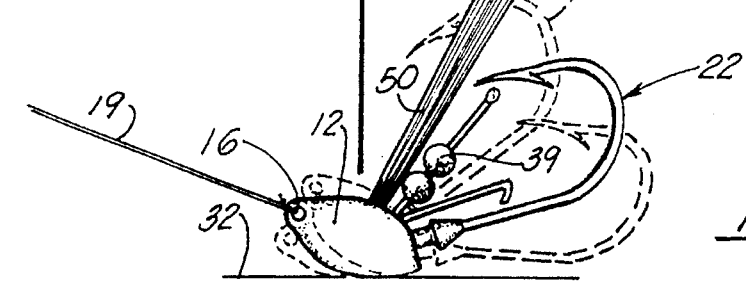
FIG. 7 illustrates a side view of the preferred embodiment of the present invention undergoing movement along a water bottom.

As further illustrated, body 12 further comprises an underside 30, as seen clearly in FIG. 6, which serves as a means for allowing body member 12 to rest on the bottom 32 or a body of water, so that the hook member 22 is supported upward as seen particularly in FIG. 3. Also, an important feature of the apparatus is the means, formed in the underside of body member 12 for stabilizing the movement of body 12 through the water, so that the hook 22 is maintained upright while the lure 10 is lowered into the water, pulled along the water bottom, or is resting on the floor 32 of the body of water. This means, as seen in FIGS. 5 and 6, comprises a channel 34 formed in the underside 30 of body 12, having sloping channel walls 36, 37 so that as water moves through channel 34, body member 12 is maintained in a balanced posture whether it is moving through the water or set on the water bottom 34. Further the sidewalls 36, 37 of channel 34, being slightly curved, provide a back and forth rocking motion to body 12 when a slight tug is placed on fishing line 19. This motion is clearly illustrated in FIG. 7, where the fishhook 22 is seen in phantom view undergoing the rocking motion, as seen by arrows 35 in FIG. 7, as the fishing line 19 tugs the body member 12 along the water bottom 34.

Turning now to other features of the invention, there is provided a means to create a rattling sound when the lure is moved or jerked through the water. This means comprises a plurality of plastic spheres 39, movably positioned on a stem 41 extending upward from the upper face 40 of body 12, so that the spheres 39 are able to move upward and downward along stem 41, and upon contact with one another, emit a rattling sound, which may attract fish. In addition, there is provided a plurality of upwardly extending filaments 50, extending, likewise, from the upper face of body 12 which help guide the lure 10 through the water during fishing.

Figure 8:
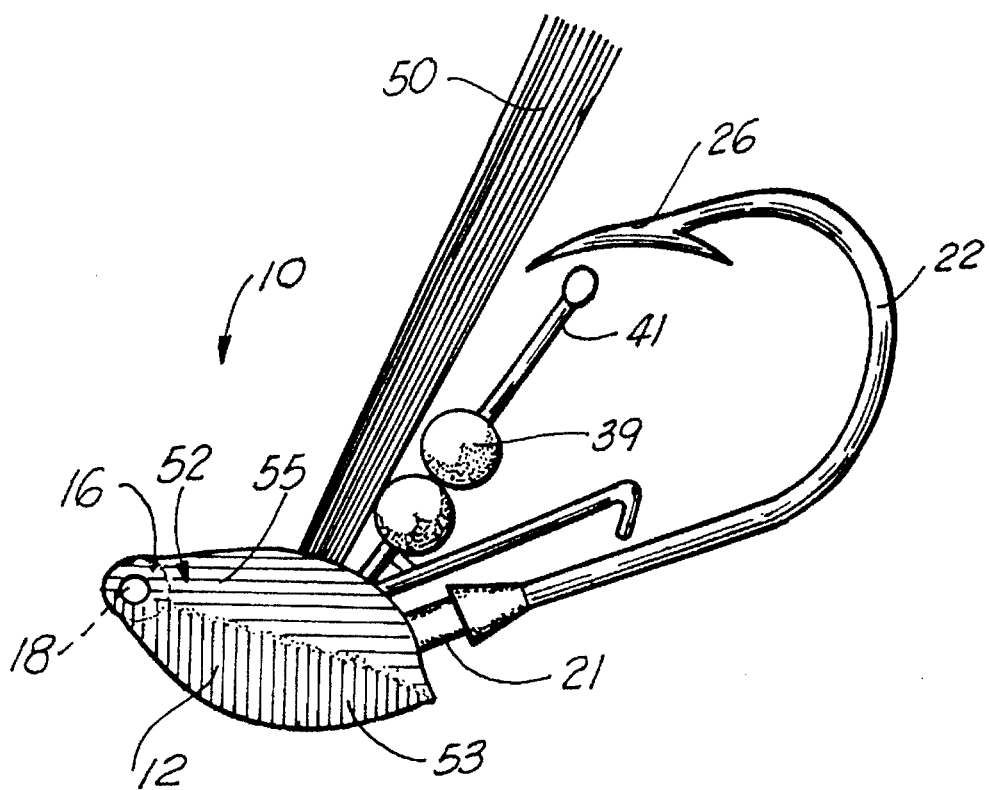
FIGS. 8 and 9 illustrate side and bottom views of an example of the color combinations utilized in the preferred embodiment of the present invention.
Figure 9:
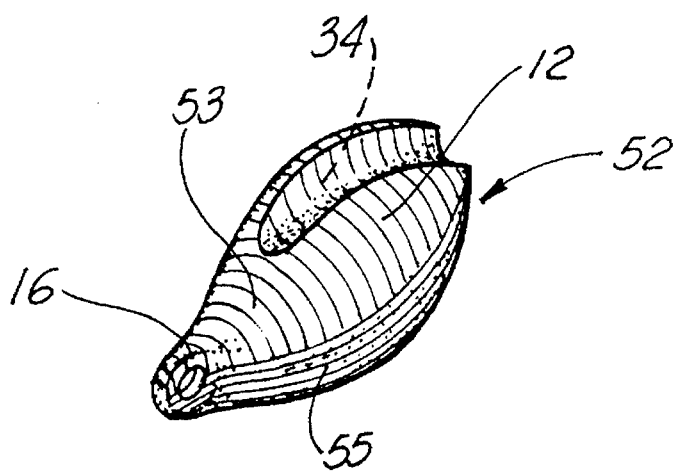

There is further provided a means, positioned on body 12, to attract fish. As illustrated in FIGS. 8 and 9, this means comprises a color combination 52 painted on the surface wall 14 of body member 12, which further includes a specific first color 53 on the underside 30 of body 12, with at least a second color 55 painted on the rest of the body member 12. This contrast in colors as part of the color combination 52 has the effect of attracting fish to the lure, and may include an endless variety of combination of colors, not limited to just two, but a combination of two or more colors. As seen in FIGS. 8 and 9, the color combination includes the first color 53 as pink on the underside of body 12, with the second color 55 as blue painted on the upper body portion of body 12. Other possible color combinations include black/orange, dark green/ light green, turquoise/ pink, but these are examples and should not be interpreted as being in a limiting sense.

Figure 4:
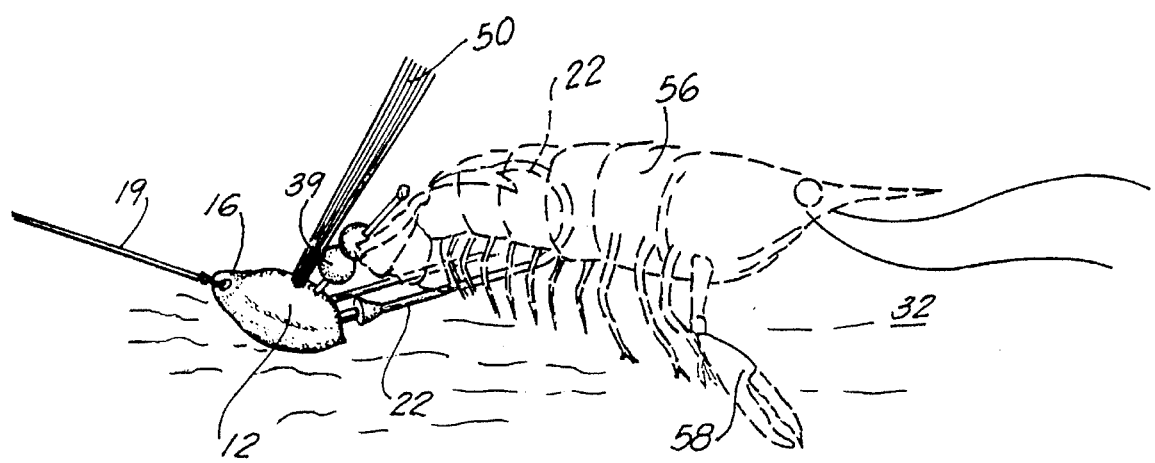

Returning now to a discussion of the fishhook 22 secured to body 12, reference is made to FIGS. 3 and 4 which illustrate a bait 56, such as a crawfish, secured to hook 22. As illustrated, due to the structure of body 12, and the position of hook 22 extending from body 12, as previously described, the crawfish bait 56, after it has been secured to the upright hook 22, as seen in FIGS. 3 and 4, gives the appearance of backward movement in the water, as would a live crawfish, with its tail 57 curled under, and its claws 58 outward. The fact that the body 12 can move through the water, with the hook 22 upright, gives a more realistic appearance which, together with the bright color combinations 52 of body 12, would entice fish to strike.

Figure 10:
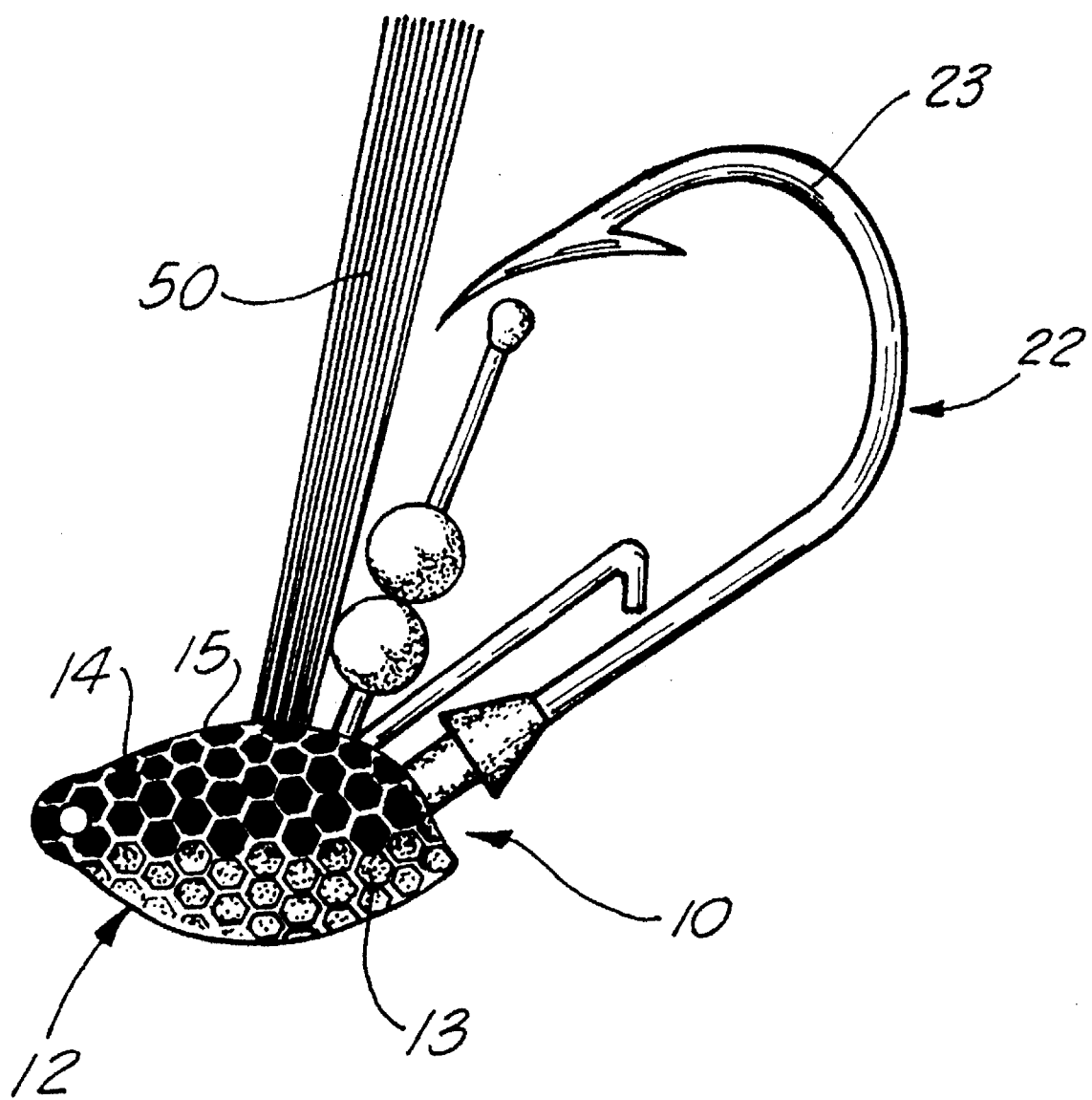
FIG. 10 illustrates an overall side view of an alternate embodiment of the present invention illustrating the surface of the body portion as being scaled.

FIG. 10 illustrates an embodiment of the apparatus of the present invention where the wall portion of body member 12 incorporates a design which would give the appearance of a fish scale 13 with the wall having a plurality of hexagonal shaped components 15 forming the entire wall surface 14 of body 12, so that when a bait is placed upon the fish hook portion 22, the scaled appearance of the wall portion 14 would give the appearance of a substantially entire bait sitting on the bottom of the water. For purposes of the embodiment, the scaled appearance would preferably be a green shade such as optic green or the like so that it is on the one hand attractive to fish, and on the other hand gives the appearance of actual scales.

As provided and described, the color combination on the lure body is substantially limitless, with the requirement being that the colors present a bright, contrast of colors on the body, so that the fish are attracted thereto. The following table lists the part numbers and part descriptions as used herein and in the drawings attached hereto.

| GLOSSARY OF TERMS | |
| --- | --- |
| fishing lure | 10 |
| body member | 12 |
| fish scale | 13 |
| hexagonal component | 15 |
| wall | 14 |
| forward end | 16 |
| bore | 18 |
| fishing line | 19 |
| upper rear face | 20 |
| proximal end | 21 |
| fishhook | 22 |
| curved portion | 23 |
| shaft | 24 |
| barbed end | 26 |
| underside | 30 |
| water bottom | 32 |
| channel | 34 |
| arrows | 35 |
| channel walls | 36, 37 |
| plastic spheres | 39 |
| upper face | 40 |
| stem | 41 |
| filaments | 50 |
| color combination | 52 |
| first color | 53 |
| second color | 55 |
| bait | 56 |
| tail | 57 |
| claws | 58 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An improved fishing lure, comprising:

a) a lure body having at least a curved underside;

b) a fishing hook extending from the lure body;

c) a channel formed on the lure body for allowing the body to rest on the bottom of a body of water so that the hook is positioned upward over the lure; and for stabilizing the lure as it is pulled through the water or lowered onto the water bottom; and d) sphere members placed on the lure body to emit a rattling sound when the spheres move along a portion of the lure body and strike one another during movement.

2. The apparatus of claim 1, wherein the means on the lure body for allowing the body to rest on the water bottom further comprises a curved, underside so that the lure can rock back and forth when a slight tug is placed on the fishing line.

3. The apparatus of claim 1 further comprising a color combination painted on the lure body to attract fish.

4. The apparatus in claim 3, wherein the color combination further comprises any combination of colors on the bottom of the lure body and a second color on the upper lure body to provide an attractive color scheme for attracting fish.

5. The apparatus in claim 3, wherein the combination of colors on the lure body include the combination of blue/ pink, black/orange, dark green/light green and turquoise/ pink.

6. The apparatus in claim 3, wherein the combination of colors on the lower body comprises a plurality of hexagonal shaped members placed across substantially the entire body, so as to give the appearance of a fish scale look.

7. The apparatus of claim 6 further comprising a color combination painted on the lure body to attract fish, the color combination selected from a group comprising the combination of blue/pink, black/orange, dark green/light green and turquoise/pink.

8. The apparatus of claim 6, wherein the means on the lure body for allowing the body to rest on the water bottom further comprises a curved, underside so that the lure can rock back and forth when a slight tug is placed on the fishing line.

9. An improved fishing lure, comprising:
 a) a lure body having at least a curved underside;
 b) a fishing hook extending from the lure body, so that a barbed end of the hook extends upward above the lure body when the lure body is resting on the water bottom;
 c) channel means formed in the underside of the lure body for stabilizing the lure as it is pulled through the water or lowered onto the water bottom; and
 d) sphere members placed on the lure body to emit a rattling sound when the spheres move long a stem on the lure body and strike one another during movement.

10. An improved fishing lure, comprising:
 a) a multi-colored lure body having at least a curved underside for effecting a rocking motion of the lure when a pull is made to the fishing line attached to the lure, the multi-colored lure body comprising a combination of colors on the outer wall of the lure to attract fish;
 b) a fishhook extending from the lure body; so that a barbed end of the hook extends upward above the lure body when the lure body is resting on the water bottom;
 c) means on the fishhook to secure a trailer thereto;
 d) channel means formed in the lure body for stabilizing the lure as it is pulled through the water or lowered onto the water bottom; and
 d) sphere members placed on a stem on the lure body to emit a rattling sound when the spheres move along the stem and strike one another during movement.

* * * * *